United States Patent
Kyle

(10) Patent No.: US 9,365,081 B2
(45) Date of Patent: Jun. 14, 2016

(54) PNEUMATIC TIRE SECURITY SYSTEM EMPLOYING INTERNAL HIGH PRESSURE AIR BAG

(71) Applicant: Hybrid Electric Conversion Co., LLC, Miami, FL (US)

(72) Inventor: Ronald L. Kyle, Akron, OH (US)

(73) Assignee: HYBRID ELECTRIC CONVERSION CO., LLC, Miami, FL (US)

( * ) Notice: Subject to any disclaimer, the term of this patent is extended or adjusted under 35 U.S.C. 154(b) by 22 days.

(21) Appl. No.: 14/327,011

(22) Filed: Jul. 9, 2014

(65) Prior Publication Data

US 2015/0013870 A1    Jan. 15, 2015

Related U.S. Application Data

(60) Provisional application No. 61/857,444, filed on Jul. 23, 2013, provisional application No. 61/844,111, filed on Jul. 9, 2013.

(51) Int. Cl.
*B60C 5/02* (2006.01)
*B60C 17/02* (2006.01)
*B60C 5/24* (2006.01)

(52) U.S. Cl.
CPC .. *B60C 17/02* (2013.01); *B60C 5/24* (2013.01)

(58) Field of Classification Search
CPC .................................. B60C 5/24; B60C 17/02
See application file for complete search history.

(56) References Cited

U.S. PATENT DOCUMENTS

| 4,164,250 A | 8/1979 | Shichman ............... B60C 17/00 |
| 7,165,587 B2 | 1/2007 | Tsukagoshi et al. .......... 152/512 |

FOREIGN PATENT DOCUMENTS

| CN | 102336122 | | 2/2012 | ............. B60C 17/02 |
| DE | 3447123 | * | 5/1986 | |
| DE | 10164092 | * | 7/2003 | |
| GB | 851808 | * | 10/1960 | |
| GB | 1383077 | * | 2/1975 | |
| JP | 2002067632 | | 3/2002 | ............. B60C 17/02 |
| JP | 20022067632 | | 3/2002 | ............. B60C 17/02 |
| JP | 4215216 | * | 1/2009 | |
| JP | 102336122 | | 2/2012 | ............. B60C 17/02 |
| RU | 2309854 | | 11/2007 | ............. B60C 17/02 |
| RU | 2363594 | | 8/2009 | ............. B60C 17/02 |

OTHER PUBLICATIONS

International Search Report mailed Oct. 16, 2014 in corresponding application No. PCT/US2014/045926.
Written Opinion mailed Oct. 16, 2014 in corresponding application No. PCT/US2014/045926.

* cited by examiner

*Primary Examiner* — Justin Fischer
(74) *Attorney, Agent, or Firm* — Renner Kenner Greive Bobak Taylor & Weber

(57) ABSTRACT

A system for allowing a pneumatic tire supported on a wheel rim of a vehicle to continue in operation after rupture of the tire. The system includes an air bag container which divides the interior tire volume into a radial outer chamber providing normal pressure for inflation of the tire and a radial interior chamber, within the air bag, which is inflated to a substantially higher pressure. The container is intended to rupture when the tire is deflated by a puncture or the like allowing the higher pressure air bag to escape from its container and fill the entire tire volume at a normal operating pressure.

16 Claims, 4 Drawing Sheets

PNEUMATIC TIRE SECURITY SYSTEM EMPLOYING INTERNAL HIGH PRESSURE AIR BAG

CROSS-REFERENCE TO RELATED APPLICATIONS

This application claims priority of U.S. Provisional Patent Application No. 61/844,111 filed Jul. 9, 2013, and U.S. Provisional Patent Application No. 61/857,444 filed Jul. 23, 2013, the contents of which are incorporated herein by reference.

FIELD OF THE INVENTION

This invention relates to pneumatic tires for automotive vehicles and more particularly to a system employing an inflated air bag within the internal volume of a tire that, in the event of a rupture of the tire during service, will expand to allow for continued control and limited operation of the vehicle.

BACKGROUND OF THE INVENTION

When conventional pneumatic tires of the type used on automobiles, trucks, and the like are damaged, by a puncture or the like, so that they lose pressure and collapse, the vehicle is unable to continue and the tire must be repaired or replaced before driving can continue. This is both inconvenient and dangerous as tire failures often result in the loss of vehicle control, serious injuries, and fatalities. A tire failure in busy traffic or a hostile environment can also be dangerous. In some situations, such as for security vehicles and military applications, it may be very dangerous.

In the past, two solutions have been proposed to allow at least limited continued driving of a vehicle after a tire loses inflation. One of these employs self-supporting tires which have stiffer, heavier reinforced sidewalls than conventional tires, which temporarily support the weight of the vehicle when air pressure is lost. Alternatively, tires may use an auxiliary support ring attached to the wheel that will temporarily support the weight of the vehicle.

While these run-flat tires are currently used for specialty application vehicles, such as military, armored cars, emergency, and NASCAR vehicles, their adoption as a mainstream replacement for conventional tires has not occurred for a number of reasons. To incorporate the run-flat support, several key performance features are compromised. These include poor ride, poor handling, poor traction, lower fuel economy, lower life, higher cost, and difficulty of servicing of previous run-flat tires. The previous designs only provide for operating the vehicle on a flat tire rather than reestablishing full support for the tire so that it and the vehicle can, without interruption, resume normal operation.

Underinflated tires are a major cause of tire failure. Automatic tire inflation systems are desirable for maintaining proper tire pressures, preventing tire failures, extending tire life, and maintaining tire performance for safe operation. While tire pressure monitoring systems have been adopted for mainstream use on certain vehicles, the automatic tire inflation systems have not been adopted for mainstream use as they are complicated, expensive, and difficult to service.

SUMMARY OF THE INVENTION

The present invention is therefore directed toward a tire security system designed to be supported within a new or in-service conventional pneumatic tire so that it deploys when the outer tire is ruptured to expand and support the damaged tire to allow at least limited driving without the inconveniences of previous run-flat tire systems.

A preferred embodiment of the present invention, which will be subsequently disclosed in detail, employs an air bag adapted to be disposed within an inflated tire and essentially supported on the tire rim. The bag is initially folded so that it fits within a flexible container having a smaller volume than the inflated tire. In use, the tire is inflated to a first, normal running pressure and the air bag is then inflated to a second, higher pressure. The air bag is constrained by the container in its folded condition so that it occupies only a portion of the volume inside the tire cavity after it is inflated.

When the tire is damaged by a puncture or accident, so that it loses pressure, the air bag container is designed to rupture as a result of the lowered pressure on its outer surface and the continued higher pressure, from the air bag, on its inner surface. It then releases the air bag, which unfolds to bear against the inner side of the tire and allow the vehicle to continue operating, at least for limited distances, in a conventional manner.

The container for the air bag preferably has a uniform thickness except along one circumferential line wherein the container is formed of a thinner section of material which tears when the air bag is under pressure and the tire is ruptured or punctured so as to reduce the pressure on the outer side of the container to generally atmospheric. The air bag may be folded so as to fit within the container yet expand sufficiently when the tire ruptures as to fill the entire volume of the tire, either by one or more radial folds or one or more circumferential folds.

In one embodiment of the invention the air bag is seated on two separated circumferential lines on the interior of the air bag container. In other embodiments the air bag may be closed with its surfaces supported by the container and the tire rim.

Any of the versions of the air bag and the air bag container assembly can be fitted to and easily installed in any typical tire and rim assembly. The air bag is preferably integral with or bonded to the air bag container interior except for the portion of the air bag that will expand to fill the tire and provide support for the tire when the tire fails.

Versions of the air bag and its container may be designed for use with any tire designs. For example, some tires have a different diameter for each bead and some vehicles use two-piece split rims to facilitate the mounting and service of certain run-flat systems. In a preferred embodiment of the invention the air bag will have an inflation valve located at a hole provided in the rim for the tubeless tire valve. The inflation valve is preferably designed to provide a seal that will contain the air in the rim and tire assembly and will be similar to currently available conventional tubeless tire valves.

In one embodiment of the invention, multiple air bags which are spaced radially about the rim, may be employed. This is particularly advantageous for vehicles operating in high-risk environments where multiple air bags may be used for greater protection. For example, if a bullet pierces the tire and one air bag, the other air bags may expand to fill the tire volume.

In another embodiment of the invention a spacer is provided over the circumference of the air bag in contact with the inner side of the air bag container. The spacer is designed so that its circumference expands upon release of the air bag to fit within the tire. The spacer would also fit the width of the tire tread and provide for protection of the air bag from any projectile that might penetrate through the tread and into the tire cavity. The spacer can be made from a variety of materials such as vulcanized rubber compounds or thermoplastic materials depending on the application and designer preference. In another embodiment of the invention, the air bag may be formed of an elastomeric material so that the air bag would be similar to a heavy-duty inner tube that would fit in to the container without folding and upon deployment would expand elastically to fill and support the tire.

In still another embodiment of the invention, the higher pressure within the air bag might be used to supplement or replace air that seeps out of the pressurized tire volume. A control valve placed between the two volumes senses the lower pressure in the tire volume to control this flow to automatically maintain the specified pressure in the pressurized tire volume. The valve would also limit the air flow from within the air bag into the tire volume to a value which would leave sufficient pressure in the air bag to fill the interior tire volume in the event of rupture of the tire.

BRIEF DESCRIPTION OF THE DRAWINGS

The description makes reference to the accompanying drawings in which.

DETAILED DESCRIPTION OF PREFERRED EMBODIMENTS OF THE INVENTION

Figure 1:
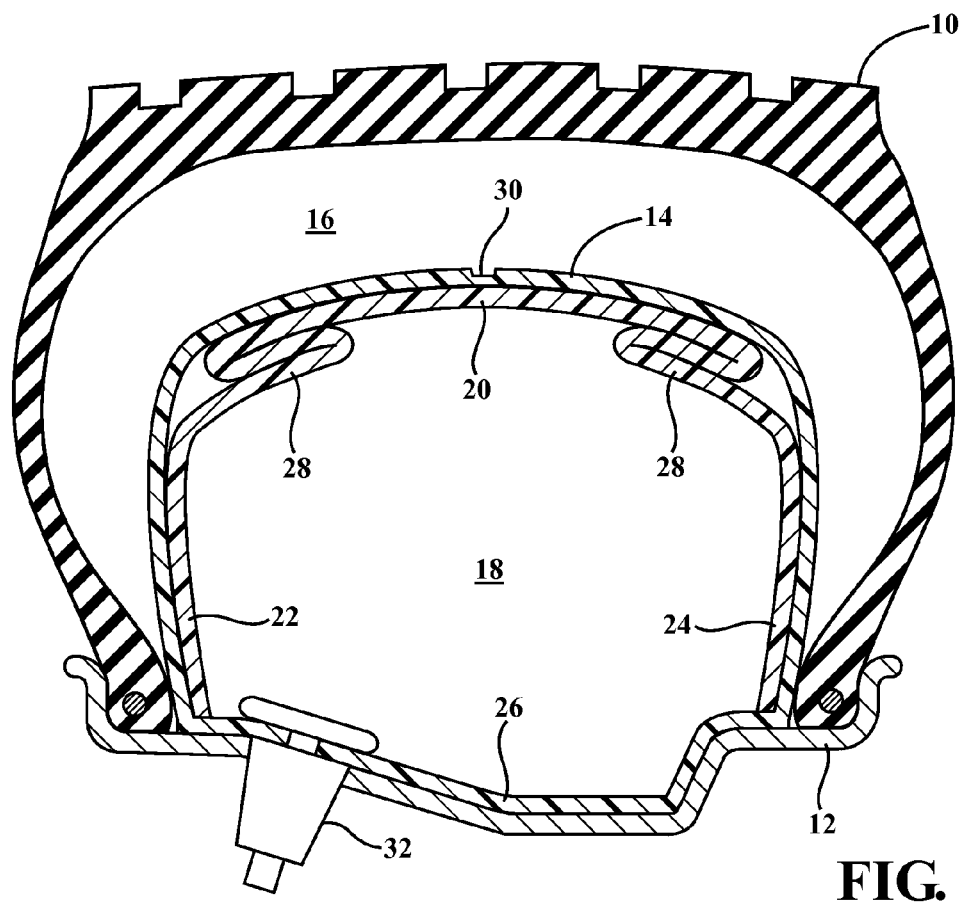
FIG. 1 is a cross section of a tire equipped with an air bag and its container and a fill valve, as formed in accordance with a preferred embodiment of the invention.

FIG. 1 is a cross-sectional view through a conventional tire 10 mounted on a conventional wheel rim 12. FIG. 1 does not disclose the inflation valve for the tire volume which would be located at a different rotational position of the rim.

An air bag container 14, which extends through the entire circumference of the tire 10, divides the volume between the tire and the rim 12 into an outer chamber 16, within the tire 10, and an inner chamber 18, bounded by the rim 12 and the container 14. The chamber 16 may typically contain about 40% of the entire volume between the tire and the rim while the area under the container and inner chamber 18 would constitute 60% of the volume. These volumes are not critical and may be adjusted in accordance with a preferred design.

Figure 2:
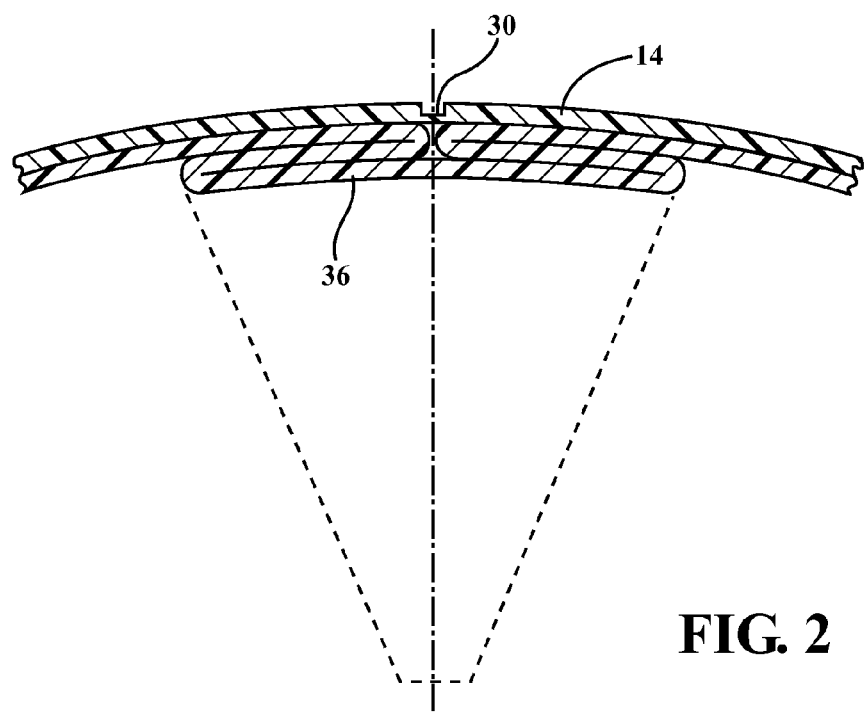
FIG. 2 is a detailed section through the air bag and the container illustrating a radial overlap in the air bag to accommodate the fully expanded volume of the air bag to the smaller volume within the air bag container.

The container 14 encloses an air bag 20 which is formed of a strong flexible material which may be nylon in certain applications, Kevlar® in others, or similar materials. In the preferred embodiment the air bag 20 is integral with or bonded to the air bag container at its two ends 22 and 24. The central section of the air bag, which is intended to fill the tire volume or outer chamber 16 as well as the volume or inner chamber 18 when the tire ruptures, is supported within but is not secured to the outer container. The air bag container 14 is a closed toroid with its radial outer section 26 secured to the central section of the rim 12. Alternatively, the section 26 can be free of the rim 12 but stored therein, for installation purposes. The air bag is folded at two circumferential areas 28 sandwiching its central section so as to provide sufficient area to the air bag 20 to allow it to expand in the event of rupture of the tire. In an alternative embodiment of the invention the fold lines 28 illustrated in FIG. 1 may take the form of radial folds 36, as illustrated in FIG. 2.

The container 14 has a linear, circumferentially extending rupture seam 30 at which the thickness of the container is decreased relative to the balance of the container. In use, after the tire is filled with gas to a pressure sufficiently below its normal operating pressure to accommodate the increase in pressure when the air bag is filled through a conventional inflation valve (not shown), the air bag chamber 18 is filled with air or equivalent gases through an inflation valve 32 which passes through a hole in the rim 12. The air bag is then filled to a substantially higher second pressure such as 35-50 psi, raising the pressure in the tire chamber 16 to a normal operating pressure such as 25-35 psi.

Figure 3:
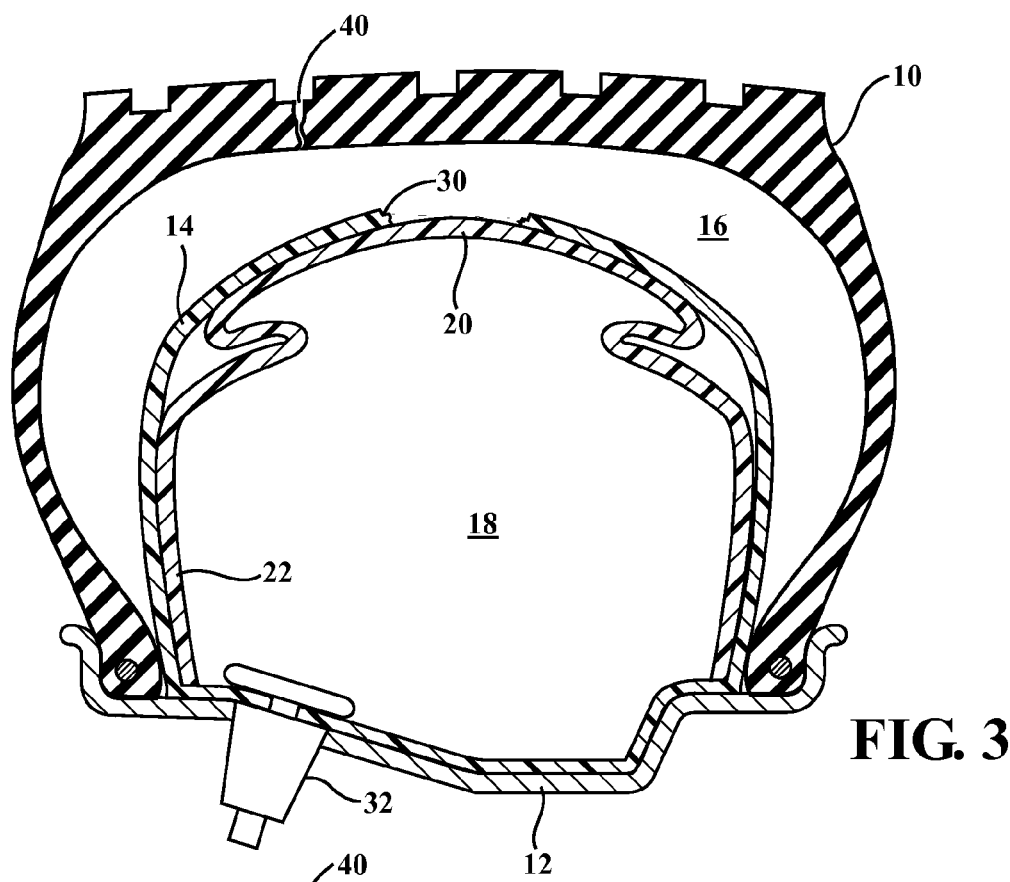
FIG. 3 is a cross-sectional view of a tire equipped with the present invention, as illustrated in FIG. 1, after a rupture of the tire, illustrating the tear in the air bag container at its rupture seam, and the air bag partially expanded out of the container.

FIG. 3 illustrates a condition in which a puncture or the like has formed a separation 40 in the wall of the tire 10 releasing the pressure in the chamber 16 so that it drops to approximately atmospheric. Previous to the separation 40 occurring in the tire 10, the pressure in the chamber 16 effectively opposes much of the pressure in the air bag volume 18 and prevents separation of the container 14 along the rupture seam 30. Removal of the pressure in the chamber 16 is designed to cause the container 14 to tear along the seam 30 and release the air bag 20 to allow it to expand into the volume 16 under the force of a higher pressure within the air bag volume 18 closing off the rupture 40.

Figure 4:
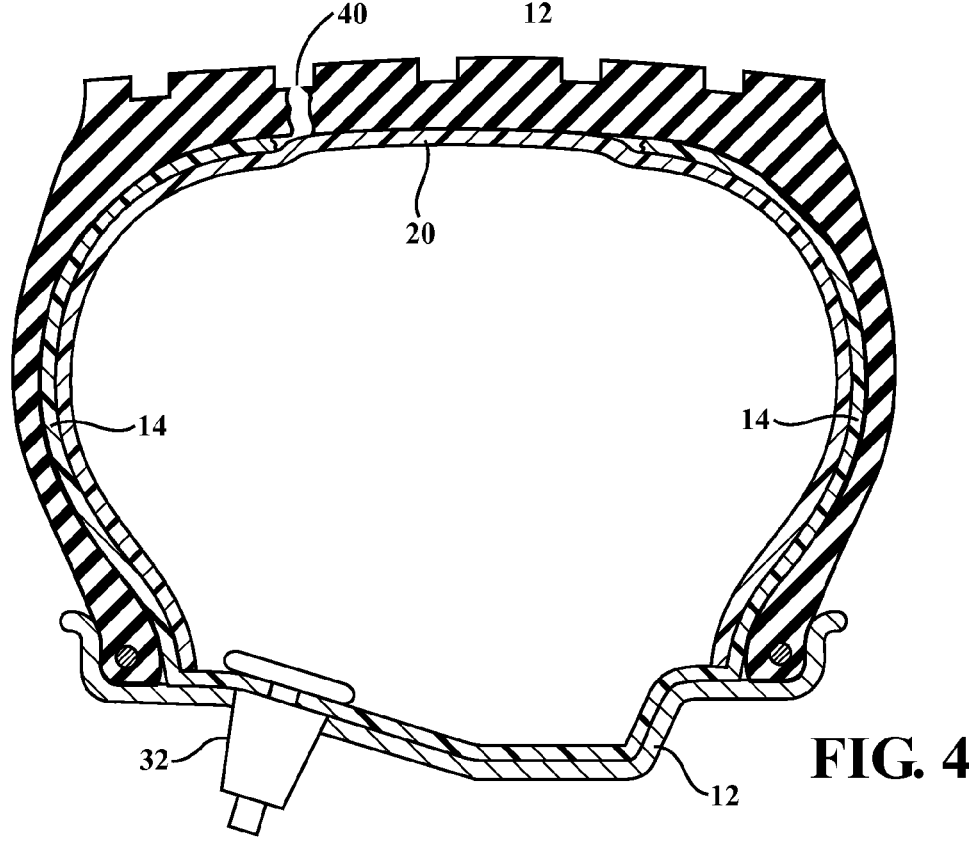
FIG. 4 is a cross section of the preferred embodiment of the invention after the air bag has expanded to sustain and fill the volume of a ruptured tire.

FIG. 4 illustrates the tire after the air bag 20 has fully expanded to fill the entire volume between the interior of the tire 10 and the rim 12. The air bag 20 is unfolded so that it is fully expanded and lies snugly against the separated sections of the container 14 and the interior wall of the tire in the area where the container is separated. In this condition the vehicle should be able to be driven normally until it is convenient to repair or replace the tire 10.

The air bag system illustrated in FIGS. 1-4 and formed primarily by the air bag 22 and its container 14, is flexible and can be readily installed into conventional tires even when the size and profile may require deformation or folding the air bag to insert it into the tire cavity prior to mounting the tire on the rim. While the container 14 is illustrated as a single piece, optionally the air bag container 14 and the air bag 20 might be formed as two separate pieces bonded together at certain places to facilitate assembly and installation in accordance with the application.

As an alternative to providing separate inflation valves for the chambers 16 and 18, the invention may employ an inflation valve of the type that is designed for the inflation and pressurization of air bags, tires, etc. which have two or more air chambers. These valves are designed to simultaneously inflate and separately maintain the pressure in each of the chambers.

The air bag 20 and container 14 can be made with nylon fibers, Kevlar® fibers, glass fibers, carbon fibers, a suitable combination of fibers, or any available materials that might be suitable for this application. The air bag is preferably impregnated or coated with a material such as vulcanized rubber polymer in order to maintain the air pressure for a reasonable time, to provide protection from damage and to provide a good connection between the tire and the air bags. The portion of the air bag that comes into contact with the portion of the tire underneath the tire tread when the tire is damaged would preferably have a polymer coating or an area of heavier fiber to provide a strong segment in case the tire tread is completely or partially destroyed. This thicker portion of the air bag under the tire tread will also prevent foreign objects that may have penetrated the tire tread or fragments of the steel tire cord in the tire tread from penetrating the air bag.

Figure 5:
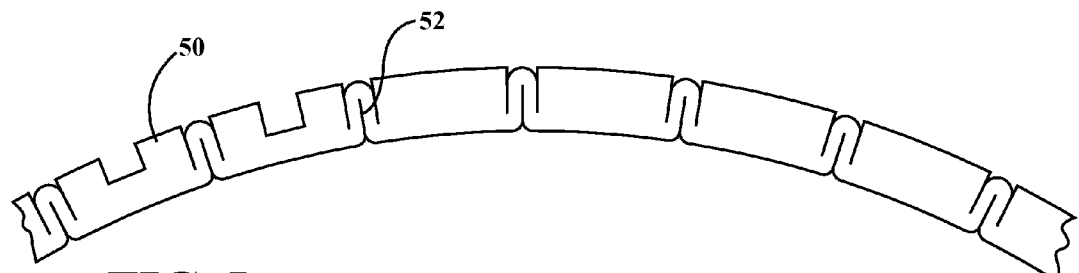
FIG. 5 is a detailed view of a spacer that may be placed between the air bag and its container, which is capable of elongating as the air bag expands out of its torn container to form a protective surface under the damaged tire.

Another option to provide more protection is to add a spacer 50, as illustrated in FIG. 5. The spacer has multiple folds 52 so that its circumference would expand upon release of the air bag to fit beneath the tire. The spacer is also designed to fit the width of the tire tread and to provide for the protection of the air bag from any projectile that might penetrate through the tread and into the tire cavity by a short distance less than the thickness of the spacer. The spacer can be made from a variety of materials such as vulcanized rubber compounds or thermoplastic materials depending on the application.

Figure 6:
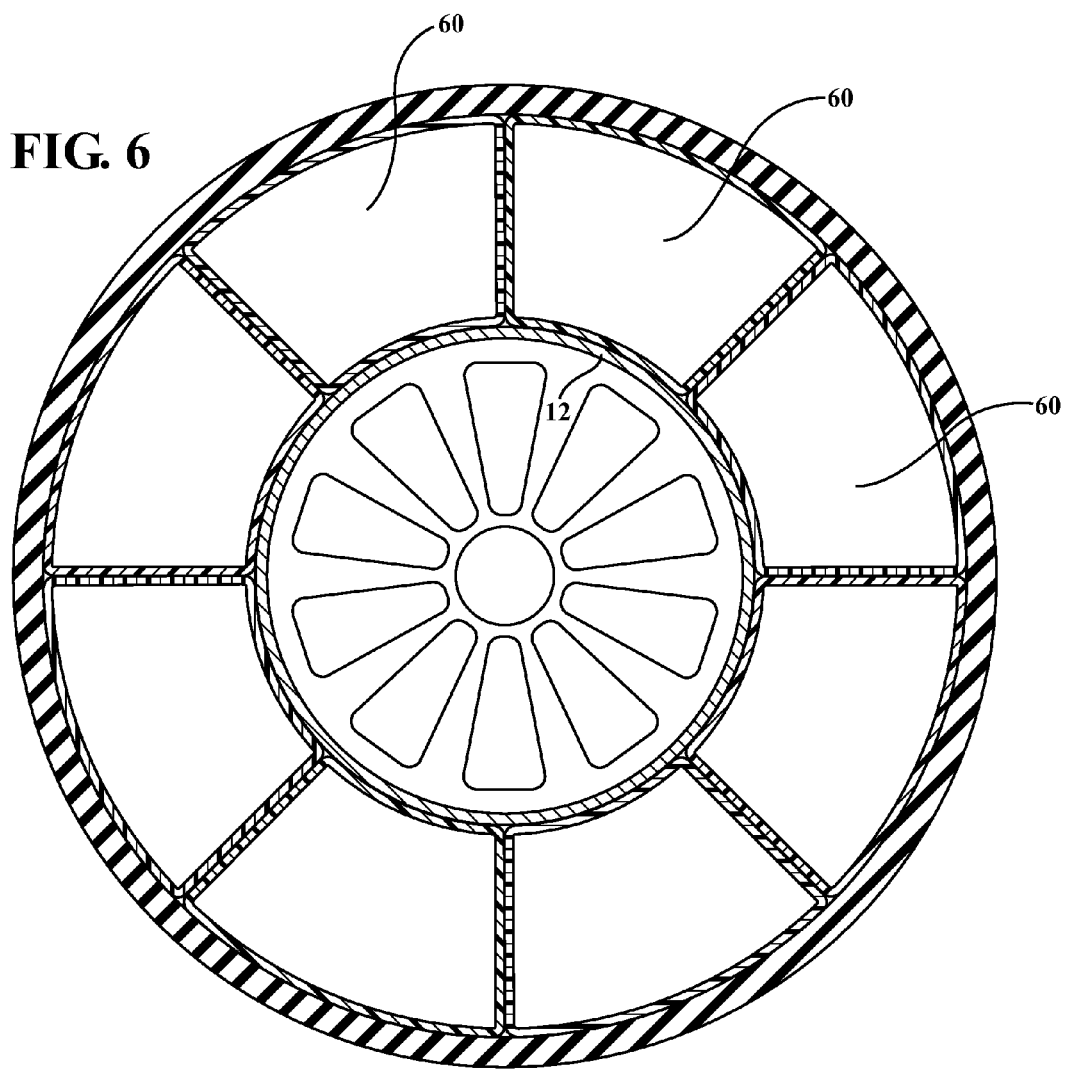
FIG. 6 is a cross-sectional view of an embodiment of the present invention using multiple radial air bags to provide support for a damaged tire even if one or more of the air bags is subsequently damaged.

FIG. 6 illustrates an embodiment of the invention where a plurality of air bags 60 are employed and arrayed radially about the tire. Any reasonable number of air bags may be used depending on the security requirements. A greater number of air bags will provide a greater probability for continued reasonable operation after tire damage or failure occurs. If one or more of the air bags is punctured or otherwise damaged during inflation or operation, a vehicle will still be reasonably supported by the remaining air bags. A common rail inflation system (not shown) could be used with one-way valves to maintain the pressure in each of the multiple air bags to ensure their deployment and effective use.

Figure 7:
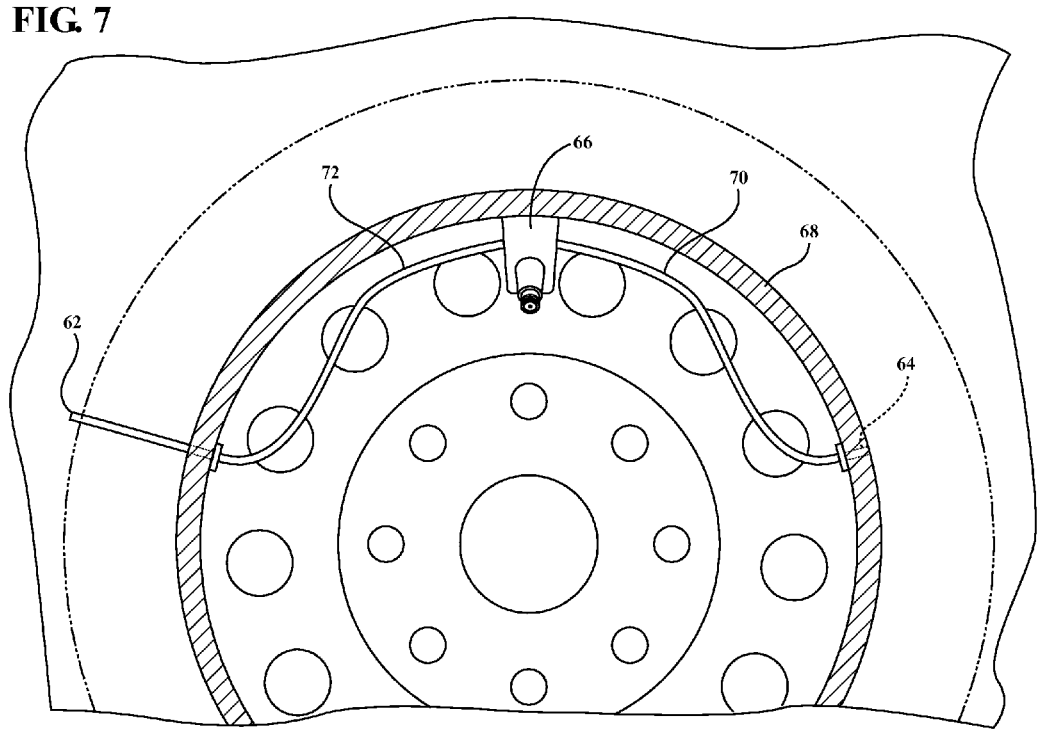
FIG. 7 is an end view of a tire formed in accordance with the present invention and including air passages passing through a control valve and extending through the control valve between the higher pressure air bag and the lower pressure tire volume, to supplant lost air from the tire volume, before rupture of the container.

FIG. 7 illustrates an arrangement for maintaining the pressure in an outer tire chamber 62 from the air bag chamber 64 in the present invention. A valve 66 supported on the rim 68 has an input line 70 from the interior of the air bag chamber and an outlet line 72 extending into the tire volume 62. The valve 66 may be any appropriate regulator valve such as a two-stage, diaphragm-sensing, pressure-reducing valve. The valve automatically measures the pressures and replenishes the tire volume 62 from the air bag chamber 64 as long as the air bag volume does not fall beneath the value that will be required to fully inflate the tire in the event of a rupture of the tire. The valve 66 can also be used for inflation of the air bag chamber 64.

The invention claimed is:

1. A system mounted on an automotive wheel rim supporting a pneumatic tire, the system allowing continued operation of the vehicle after rupture of the tire, the system comprising:
    an air bag having an outer surface, supported within a volume defined by the tire and the rim;
    a flexible container for the air bag having an inner surface extending over the outer surface of the air bag;
    the tire being adapted to be inflated to a first pressure and the air bag being adapted to be inflated to a second pressure higher than said first pressure so that the bag bears against the inner surface of the container and is constrained by the container so that it fills only a portion of the volume defined by the tire and the rim;
    the container being adapted to tear open when the tire is ruptured and the first pressure is thereby reduced, removing the constraint on the container, allowing the air bag to then expand to fill the volume between the tire and rim and allow continued operation of the vehicle, wherein the tire has a tread formed on its outer side and the container for the air bag has a uniform thickness except for a circumferential line of reduced thickness extending on the side of the container adjacent the tread, the container tearing open along the reduced thickness line when the tire ruptures; and
    a substantially planar spacer extending between the air bag and the air bag container, the spacer containing folds which open up when the container ruptures and the air bag extends over the interior of the tire, the spacer being operative to separate the air bag from the surface of the tire so that the air bag is protected from short punctures extending through the tire when expanded so as to bear against the tire.

2. The system of claim 1 wherein the surface of the air bag is greater than the interior surface of the container so that the air bag is partially folded within the container before any rupture of the tire.

3. The system of claim 1 including a first inflation valve supported in a hole in the rim for allowing inflation of the air bag.

4. The system of claim 1 including a second inflation valve for inflating the tire volume between the interior surface of the tire and the outside of the air bag container.

5. The system of claim 1, further including a valve, supported on the rim, and having a first connection to the volume within the air bag, and a second connection to the volume within the tire, externally of the air bag; the valve being operative to sense the pressure within the air bag and within the tire volume externally of the air bag and to bleed air from the volume within the air bag to the volume within the tire externally of the air bag in order to maintain normal operating pressure in the tire cavity.

6. The system of claim 5, wherein the valve discontinues bleeding air into the tire volume from the air bag when the pressure within the air bag is decreased to a predetermined value.

7. A system mounted on an automotive wheel rim supporting a pneumatic tire, the system allowing continued operation of the vehicle after rupture of the tire, the system comprising:
    a plurality of air bags each having an outer surface, supported on the tire rim at radial intervals about the rim;
    a plurality of flexible containers, each associated with one of the air bags, each container having an inner surface extending over the outer surface of its associated air bag;
    the tire being adapted to be inflated to a first pressure and the air bags being adapted to be inflated to a second pressure higher than the first pressure so that each bag bears against the inner surface of its associated container and is constrained by the container so that it fills only a portion of the volume defined by the tire and the rim;
    each container being adapted to tear open when the tire is ruptured and the first pressure is thereby reduced, removing the constraint on the container, allowing the air bags to then expand to fill the volume between the tire and the rim and allow continued operation of the vehicle, wherein the tire has a tread formed on its outer side and each container for the air bag has a uniform thickness except for a circumferential line of reduced thickness extending on the side of the container adjacent the tread, the container tearing open along the reduced thickness line when the tire ruptures; and a substantially planar spacer extending between each air bag and the associated air bag container, the spacer containing folds which open up when the container ruptures and the air bags extend over the interior of the tire, each spacer being operative to separate the air bag from the surface of the tire so that the air bag is protected from short punctures extending through the tire when expanded so as to bear against the tire.

8. A system mounted on an automotive wheel rim supporting a pneumatic tire, the system allowing continued operation of the vehicle after rupture of the tire, the system comprising:

an air bag having an outer surface, supported within a volume defined by the tire and the rim;

a flexible container for the air bag having an inner surface extending over the outer surface of the air bag;

the tire being adapted to be inflated to a first pressure and the air bag being adapted to be inflated to a second pressure higher than said first pressure so that the bag bears against the inner surface of the container and is constrained by the container so that it fills only a portion of the volume defined by the tire and the rim;

the container being adapted to tear open when the tire is ruptured and the first pressure is thereby reduced, removing the constraint on the container, allowing the air bag to then expand to fill the volume between the tire and rim and allow continued operation of the vehicle; and a substantially planar spacer extending between the air bag and the air bag container, the spacer containing folds which open up when the container ruptures and the air bag extends over the interior of the tire, the spacer being operative to separate the air bag from the surface of the tire so that the air bag is protected from short punctures extending through the tire when expanded so as to bear against the tire.

9. The system of claim 8 wherein the tire has a tread formed on its outer side and the container for the air bag has a uniform thickness except for a circumferential line of reduced thickness extending on the side of the container adjacent the tread, the container tearing open along the reduced thickness line when the tire ruptures.

10. The system of claim 8 wherein the surface of the air bag is greater than the interior surface of the container so that the air bag is partially folded within the container before any rupture of the tire.

11. The system of claim 8 including a first inflation valve supported in a hole in the rim for allowing inflation of the air bag.

12. The system of claim 8 including a second inflation valve for inflating the tire volume between the interior surface of the tire and the outside of the air bag container.

13. The system of claim 8, further including a valve, supported on the rim, and having a first connection to the volume within the air bag, and a second connection to the volume within the tire, externally of the air bag; the valve being operative to sense the pressure within the air bag and within the tire volume externally of the air bag and to bleed air from the volume within the air bag to the volume within the tire externally of the air bag in order to maintain normal operating pressure in the tire cavity.

14. A system mounted on an automotive wheel rim supporting a pneumatic tire, the system allowing continued operation of the vehicle after rupture of the tire, the system comprising:

an air bag having an outer surface, supported within a volume defined by the tire and the rim;

a flexible container for the air bag having an inner surface extending over the outer surface of the air bag;

the tire being adapted to be inflated to a first pressure and the air bag being adapted to be inflated to a second pressure higher than said first pressure so that the bag bears against the inner surface of the container and is constrained by the container so that it fills only a portion of the volume defined by the tire and the rim;

the container being adapted to tear open when the tire is ruptured and the first pressure is thereby reduced, removing the constraint on the container, allowing the air bag to then expand to fill the volume between the tire and rim and allow continued operation of the vehicle; and a two-stage, diaphragm-sensing valve, supported on the rim, and having an input line to the volume within the air bag, and an output line to the volume within the tire, externally of the air bag; the two-stage, diaphragm-sensing valve being operative to sense the pressure within the air bag and within the tire volume externally of the air bag and to bleed air from the volume within the air bag through said input line, said two-stage, diaphragm-sensing valve and said output line to the volume within the tire externally of the air bag in order to maintain normal operating pressure in the tire cavity.

15. The system of claim 14 further comprising a substantially planar spacer extending between the air bag and the air bag container, the spacer containing folds which open up when the container ruptures and the air bag extends over the interior of the tire, the spacer being operative to separate the air bag from the surface of the tire so that the air bag is protected from short punctures extending through the tire when expanded so as to bear against the tire.

16. The system of claim 14 wherein the tire has a tread formed on its outer side and the container for the air bag has a uniform thickness except for a circumferential line of reduced thickness extending on the side of the container adjacent the tread, the container tearing open along the reduced thickness line when the tire ruptures.

\* \* \* \* \*